United States Patent [19]

Wiget

[11] Patent Number: 4,960,000
[45] Date of Patent: Oct. 2, 1990

[54] DEVICE FOR MEASURING A PHYSICAL QUANTITY

[75] Inventor: Fridolin Wiget, Neuchâtel, Switzerland

[73] Assignee: Asulab, S.A., Switzerland

[21] Appl. No.: 427,404

[22] Filed: Oct. 27, 1989

[30] Foreign Application Priority Data

Nov. 2, 1988 [FR] France .................................. 88 14388

[51] Int. Cl.$^5$ .............................................. G01B 7/16
[52] U.S. Cl. ...................................................... 73/778
[58] Field of Search ............ 73/32 A, 290 V, 517 AV, 73/581, 702, 778, 862.41, 862.59, DIG. 1; 374/117; 331/65, 66

[56] References Cited

U.S. PATENT DOCUMENTS

| | | |
|---|---|---|
| 4,213,337 | 7/1980 | Langdon ............................ 73/290 V |
| 4,346,363 | 8/1982 | Wilhelmson ....................... 73/178 R |
| 4,398,115 | 8/1983 | Gagnepain et al. ................. 374/117 |
| 4,498,344 | 2/1985 | Dinger . |
| 4,558,248 | 12/1985 | Valentin ............................. 374/117 |
| 4,594,898 | 6/1986 | Kirman et al. ......................... 73/778 |
| 4,741,213 | 5/1980 | Hojoh . |

FOREIGN PATENT DOCUMENTS

| | | |
|---|---|---|
| 0098796 | 1/1984 | European Pat. Off. . |
| 0101669 | 2/1984 | European Pat. Off. . |
| 0233054 | 8/1987 | European Pat. Off. . |
| 0010735 | 1/1986 | Japan ..................................... 73/702 |
| 2146120 | 4/1985 | United Kingdom ............. 73/862.59 |

Primary Examiner—Robert Raevis
Attorney, Agent, or Firm—Pollock, Vande Sande & Priddy

[57] ABSTRACT

The invention concerns a device for measuring a physical quantity, for example a force (A), and providing an output signal (Vs) whose amplitude represents the measured value. The device comprises a first oscillator (1) including a resonator (3) to which the force (A) is applied, this oscillator delivering a first alternating signal (S1) whose frequency depends on the magnitude of the force (A), a second oscillator (2) supplying a second alternating signal (S2) whose frequency is determined by the amplitude of the output signal (Vs), an EXCLUSIVE OR gate (20) receiving the first and second signals, and a low-pass filter (21) delivering the output signal (Vs) in response to a signal supplied by the gate (20). The amplitude of this output signal depends on the phase difference of the first and second signals, and constitutes a measurement of the magnitude of the applied force (A). The device is advantageously used when the measurement is to be displayed in analog form.

11 Claims, 2 Drawing Sheets

DEVICE FOR MEASURING A PHYSICAL QUANTITY

BACKGROUND OF THE INVENTION

The present invention relates to a device for measuring a physical quantity, this device comprising means for producing an alternating electric signal having a frequency representing the quantity.

Is is advantageous to measure some physical quantities, in particular force and temperature, in this way. When for instance a force is measured, this force may be applied directly to the device or may for example be derived from a pressure exerted on the device or from an acceleration which the device undergoes. In the latter case, the device performs as an accelerometer.

A force-measuring device of this type is for example described in detail in European Pat. No. EP-B-0 098 796 and the corresponding U.S. Pat. No. US-4 498 344. The device described therein includes a resonator, formed as a dual tuning fork fixed on a deformable support to which the force to be measured is applied whereby this force modifies the oscillation frequency of the resonator, and a conventional driving circuit adapted to vibrate the resonator at this frequency. The resonator and the driving circuit thus form an oscillator, the circuit being so arranged that it supplies an output signal made up by a sequence of pulses, the frequency of repetition of these pulses, i.e. the frequency of the oscillator, thus representing the force applied to the device. This frequency is then measured by a conventional counter and next calibrated, by means of a digital calculator circuit, into units of force or, possibly, into units of pressure or acceleration. Finally, the data supplied by the calculator circuit, representing the constraint applied to the resonator, is indicated by a digital display.

In this device, the frequency of the signal supplied by the oscillator, which is an analog quantity, is nevertheless measured and then processed by logic circuits in such a manner that the final result appears in digital form. Given that the oscillator signal has previously been converted to a sequence of pulses, this is the most precise, reproducible and reliable way of measuring the force applied to the device.

For some applications, it is however preferable to show the result in analog form, i.e. the result should be given by the amplitude of a signal that varies continuously, in dependence on the force to be measured and hence of the frequency of the signal supplied by the oscillator. This can be done by means of known analog circuits providing a continuous output signal whose amplitude is dependent on the frequency of the input signal. Such circuits however have the drawback of becoming somewhat imprecise and unstable with time, because their characteristics depend on components subject to ageing. It is also possible to employ logic circuits, also of known type, that directly convert a digital signal into an analog signal. While these circuits do preserve the precision and the stability of the digital measurement, they suffer from the disadvantage of being complex and expensive.

SUMMARY OF THE INVENTION

An object of the present invention is to propose a simple and inexpensive device for measuring a physical quantity, able to supply the result of the measurement in analog form while having the same advantages as the known devices that provide the result in digital form.

To achieve this, the device according to the invention, which includes means for producing a first alternating signal having a frequency representing the physical quantity to be measured, further comprises means for producing a second alternating signal having a frequency representing the amplitude of an output signal, and means for producing this output signal in such a manner that its amplitude depends on the phase difference between the first and second signals, the amplitude of this output signal thus also representing the physical quantity to be measured.

BRIEF DESCRIPTION OF DRAWINGS

Further characteristics and advantages of the measuring device according to the present invention will be apparent from the following description made by way of non-limiting example with reference to the accompanying drawings of one embodiment of such a device. In the drawings, where the same references refer to similar elements.

DETAILED DESCRIPTION

Figure 1:
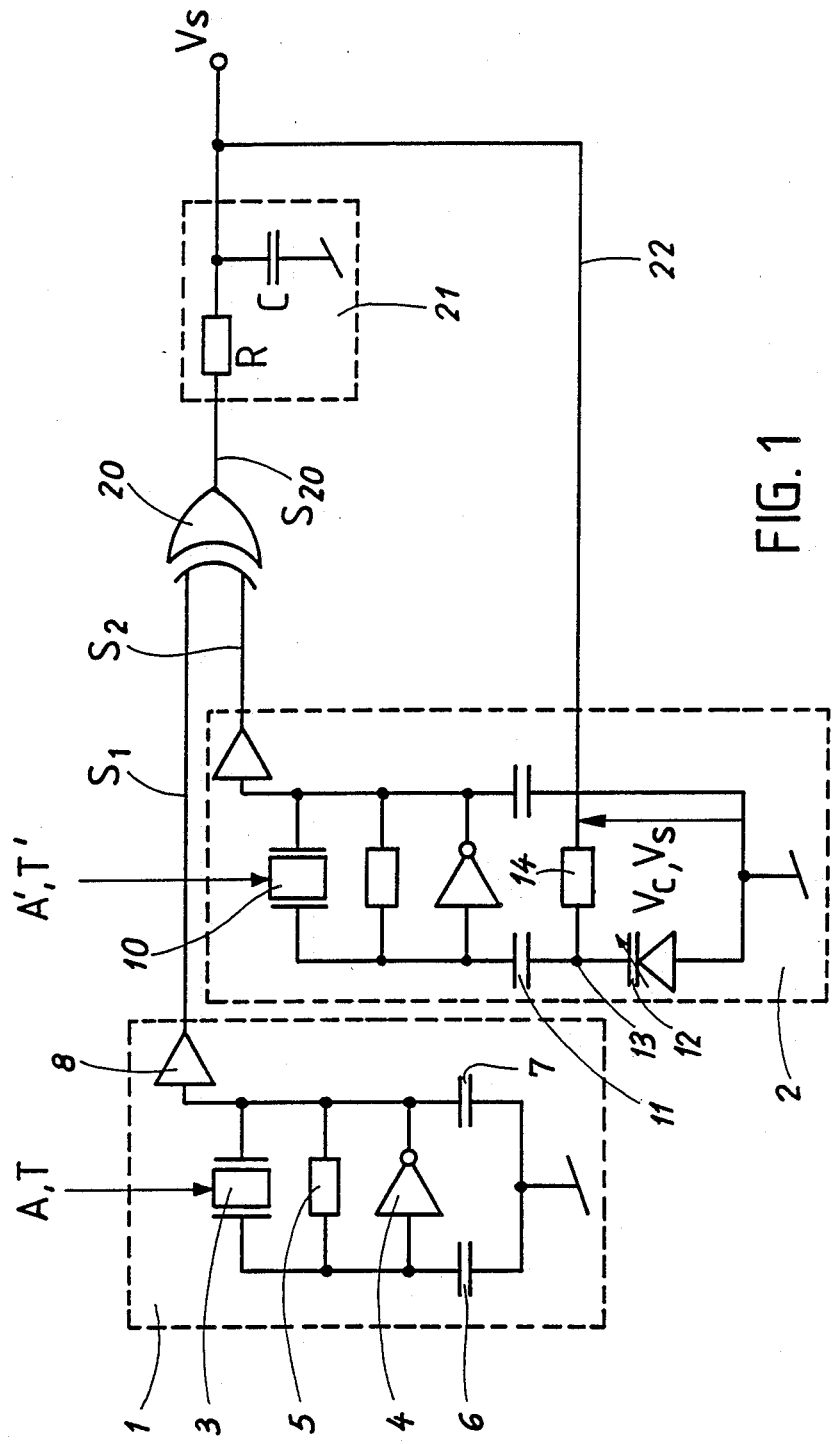
FIG. 1 is a circuit diagram of an embodiment of the device according to the invention.

The device according to the invention is shown by way of non-limiting example in FIG. 1 in an application where it is designed to measure a force A, but similar devices could equally well be adapted to measure other physical quantities.

In FIG. 1, reference 1 designates a first oscillator comprising a resonator 3 of piezo-electric material and a Colpitts type driving circuit that comprises an inverter 4, a polarization resistor 5 and two tuning capacitors 6 and 7, these components being interconnected as shown in a well known manner that will not be described.

The frequency of the output signal of inverter 4 is determined by the oscillation frequency of the resonator 3 which depends on its natural frequency, on the force it is submitted to and, to a lesser extent, on the capacitors 6 and 7 which, in this case, have a fixed capacitance.

Figure 2:
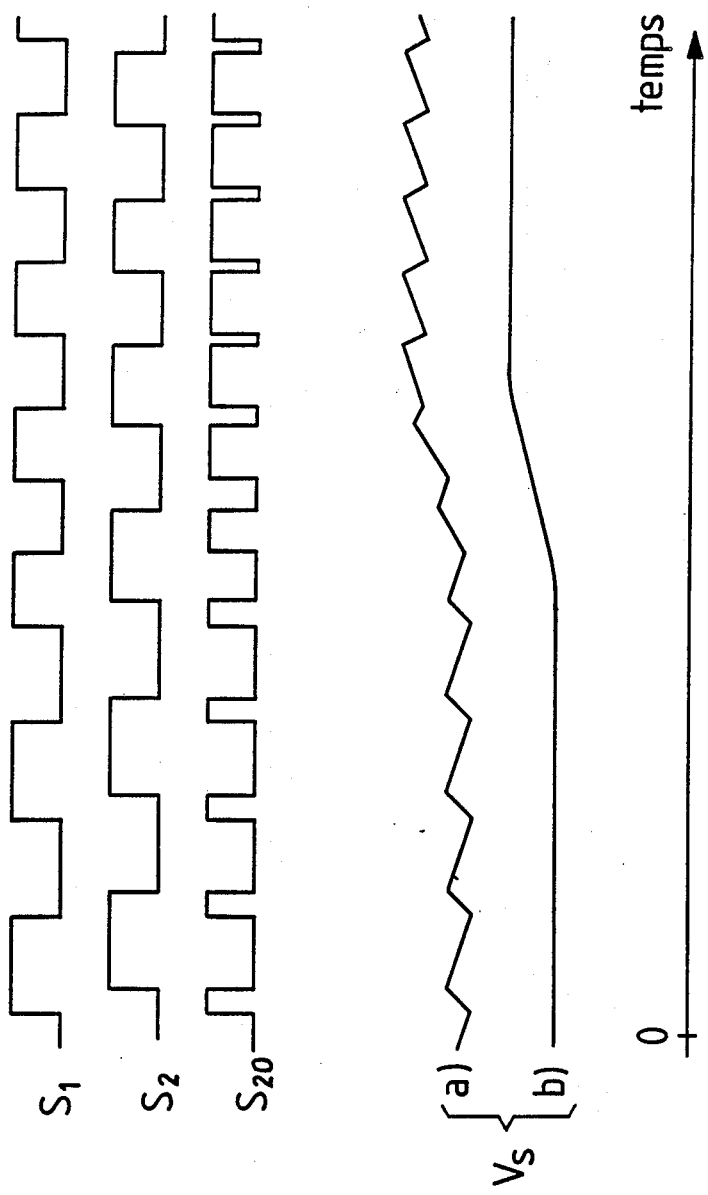
FIG. 2 shows the principal signals appearing at different points of the circuit of FIG. 1.

The output signal of inverter 4 is applied to a shaping circuit 8 which, in its simplest form, may be a high-gain amplifier. The circuit 8 thus delivers at its output, which also constitutes the output of the first oscillator 1, a signal S1 formed of a succession of rectangular waves, as shown in FIG. 2. Signal S1 will be considered to be a logic signal whose frequency, measured by the frequency of repetition of the pulses, corresponds to the frequency of oscillation of resonator 3.

In this device, the resonator 3 constitutes the force sensor and may, for example, be of the type described in the aforementioned European Pat. No. EP-B-0 098 796, and wherein the force A to be measured is applied to the resonator's support. This being so, the force A modifies the oscillation frequency of the resonator 3, which produces a variation of the frequency of signal S1 such that this frequency is a measurement of the magnitude of the applied force.

The frequency of signal S1 may depend on other parameters in addition to force A, for example the temperature T of resonator 3. Even if the thermic effect is small in such a force sensor, it cannot be eliminated entirely and leads to a measurement error that needs to be taken into account.

Supposing that all effects are linear and taking into account the temperature, if we designate the frequency of signal S1 by F1, this frequency can be expressed as:

$$F1 = Of1 + Ka.A + Kt.(T - To),\qquad(1)$$

wherein Ka and Kt are two characteristic constants of the resonator 3, To is the nominal temperature of resonator 3, and Fo1 is the nominal frequency of oscillator 1, i.e. its frequency when resonator 3 is at temperature To and no force is acting on it.

A second oscillator, designated by reference 2, is also incorporated in the circuit of FIG. 1. This oscillator 2, of the well-known VCO (Voltage Controlled Oscillator) type, comprises a resonator 10 and an oscillator driving circuit identical to that of the oscillator 1 except that one of its tuning capacitors is a fixed-capacitance capacitor 11 connected in series with a variable-capacitance capacitor 12 which, in this instance, is constituted by a reverse-polarized diode. The capacitance of capacitor 12 is controlled by a voltage Vc which is applied to the junction point 13 of the two capacitors 11 and 12 through a decoupling resistor 14. This resistor does not produce a voltage drop, which means that the voltage Vc appears directly at the terminals of the capacitor 12. Because the frequency of an oscillator depends on the capacitance of its tuning capacitors, the frequency of oscillator 2 therefore depends on the voltage Vc.

Oscillator 2 supplies a signal S2, also shown in FIG. 2, and which, like the signal S1, is formed by a succession of rectangular pulses. The frequency of signal S2, designated by F2, is dependent on Vc.

The signals S1 and S2 are periodic and have the same shape. Each of these signals is defined by its amplitude, by its frequency and also by its phase which is hereinafter designated by Pl for signal S1 and by P2 for signal S2. The phase difference (or dephasing) between the two signals S1 and S2 is designated by P12 or P21, depending upon whether the phase of signal S1 or of signal S2 is taken as reference.

To demonstrate all of the advantages of the invention, it is convenient to consider the general case where the oscillation frequency of resonator 10, like that of resonator 3, depends both on a force applied thereto, designated by A′, and on its temperature T′. In these conditions, if the effects are linear, the frequency F2 is given by the following relationship :

$$F2 = Fo2 + K'a.A' + K't.(T' - T'o) + Kv.Vc\,.\qquad(2)$$

In this relationship, K′a and K′t are characteristic constants of resonator 10, T′o is the nominal temperature of resonator 10, Kv is a characteristic constant of the oscillator 2 which depends principally on the characteristics of the variable capacitor 12, and Fo2 is the nominal frequency of oscillator 2, i.e. its frequency when A′,(T′−T′o) and Vc are all zero.

The signals S1 and S2 may be considered as logic signals each passing alternately from logic low to high and back again. These signals ar applied to the inputs of a phase comparator circuit which, in the present example, is an EXCLUSIVE OR gate 20. The signal S20 supplied by the output of gate 20 is applied to the input of a low-pass filter, 21 whose output delivers an output voltage Vs. In the illustrated example, the filter 21 is made up of a single RC unit but, of course, to improve filtering it would be advantageous to use a filter having several such units, or a different, more efficient filter.

The signal S20 supplied by gate 20 and illustrated in FIG. 2 is low when the signals S1 and S2 are simultaneously low or simultaneously high and high when S1 and S2 are simultaneously in different states: low and high or high and low. The signal S20 is thus made up of a succession of positive pulses. These pulses will be considered to be voltage pulses of constant amplitude, which amplitude can be adjusted to a given value by adjustment means not shown.

If we consider the case where the variable frequencies F1 and F2 are close to one another or are equal, the ratio of the duration of a pulse of signal S20 to the period of this signal at this instant quantifies the instantaneous dephasing between the signals S1 and S2. Because the amplitude of the pulses of signal S20 is constant, the mean voltage of this signal also quantifies this dephasing. Of course, the value of the mean voltage, corresponding to a given dephasing, may be adjusted to an arbitrary value by using the means for adjusting the amplitude of the pulses of signal S20. This mean voltage is moreover equal to the voltage Vs at the output of the low-pass filter 21 and is illustrated in FIG. 2 wherein a) corresponds to the case when this filter 21 consists in a single RC unit, and b) corresponds to the case when it is a more efficient filter.

If signal S1 is taken as the reference point of the phases and signal S2 lags S1, as shown in FIG. 2, any increase in frequency F1 caused for example by an increase in the force A will cause an increase of the dephasing P12 of S2 in relation to S1 and hence an increase in the amplitude of voltage Vs. Likewise, any reduction of frequency F1 would lead to a reduction of the dephasing P12 and, therefore, also a decrease of the voltage Vs.

In the oscillator 2, because in this example the capacitance of capacitor 12 is constituted by a diode junction, an increase of voltage Vc across this capacitor will reduce its capacitance. This reduction of the capacitance will produce an increase of the frequency F2 of oscillator 2, and consequently a reduction of the dephasing P12 and therefore a decrease of the amplitude of voltage Vs. Likewise, a reduction of voltage Vc increases the capacitance of capacitor 12, lowers the frequency F2, increases the dephasing P12 and, with it, the voltage Vs.

Given that Vc and Vs vary in opposite directions, a connection 22 between the resistor 14 and the output of filter 21 arranged to make voltages Vc and Vs equal will set up a phase locked loop (PLL) between signals S1 and S2. The phase P2 is thus locked to phase Pl, thereby rendering frequencies F1 and F2 equal, with frequency F2 following variations in F1.

If the resonator 10 is chosen to be identical to resonator 3, the characteristic constants defining them are also equal, i.e. Ka = K′a, Kt = K′t and To = T′o, and so are the nominal frequencies, namely Fo1 = Fo2. If, furthermore, the two resonators 3 and 10 are arranged close to one another so they are always at the same temperature, and since the phase locking makes the frequencies F1 and F2 equal, by subtracting relationships (1) and (2) from one another term-by-term, we obtain:

$$Vs = K.(A - A'),\qquad(3)$$

wherein K = Ka/Kv.

It follows that by so choosing and arranging the resonators 3 and 10, the voltage Vs is a linear function solely of the difference between the forces A and A'. The voltage Vs is therefore an analog measurement of the physical quantity that this difference constitutes, and this measurement is independent of temperature, which is an important advantage. The described device therefore corresponds to the object of the invention.

If the device is adapted to measure a force, it is sufficient to arrange the resonator 10 in such a manner that it is not acted upon by any force. Force A' is therefore zero, and in this instance the relationship (3) becomes:

$$Vs = K.A.$$

It is also possible to arrange the two resonators 3 and 10 in such a manner that they are acted upon by the same force in a way which oppositely influences their frequencies. In this case, we can take $A' = -A$, and relationship (3) becomes:

$$Vs = 2.K.A.$$

In the latter case, the sensitivity of the device is thus doubled in relation to the previous case where no force acted on the resonator 10.

The device can also be used as an accelerometer. For this, a mass M may for example be fixed on the support of resonator 3. When this mass M is accelerated, the force A exerted on the resonator 3 is proportional to the acceleration. The device's output signal Vs is therefore also proportional to this acceleration.

The sensitivity of such an accelerometer can also be doubled by fixing a mass $M' = M$ on the support of resonator 10 and by arranging the resonators 3 and 10 in such a manner that the forces acting on them in response to an acceleration produce variations of their frequencies that are equal in absolute value but of opposite sign.

Clearly, the device according to the invention as described above can be used for analog measurements of other physical quantities in addition to force or acceleration.

For example, the resonator 10 may be arranged in such a manner that its temperature is constant. If no force is applied to the resonators 3 and 10, the output signal Vs of the device of FIG. 1 would be an analog measurement of the temperature of resonator 3.

Of course, the described measuring device may be modified in various ways and may be embodied in other forms readily apparent to persons skilled in the art, without departing from the scope of the present invention.

What is claimed is:

1. A device for measuring a physical quantity comprising:

first oscillating means for producing a first signal having a first frequency representing the physical quantity;

second oscillating means for producing a second signal having a second frequency representing the amplitude of an output signal, said first frequency being independent from said second frequency; and means for producing said output signal so that its amplitude depends on the phase difference between said first signal and said second signal, the amplitude of said output signal thus also representing said physical quantity.

2. A device according to claim 1, wherein:

said first oscillating means for producing the first signal comprises a first resonator having an oscillation frequency dependent on said physical quantity, and a first driving circuit coupled to said first resonator for producing said first signal;

said second oscillating means for producing the second signal comprises a second resonator, a second driving circuit coupled to said second resonator for producing said second signal, and means responsive to said output signal for varying the frequency of said second signal in dependence on the amplitude of said output signal; and, said means for producing said output signal comprises a phase comparator circuit coupled to said first and second oscillating means for producing a comparison signal having a mean value representing the phase difference between said first signal and said second signal, and a low-pass filter connected to said comparator circuit for producing said output signal, such that the amplitude of said output signal represents said physical quantity.

3. A device according to claim 2, wherein said second resonator is identical to said first resonator.

4. A device according to claim 3, wherein said phase comparator circuit is an EXCLUSIVE OR gate.

5. A device according to claim 2, wherein said resonators are made of piezo-electric material.

6. A device according to claim 5, wherein said phase comparator circuit is an EXCLUSIVE OR gate.

7. A device according to claim 2, wherein said second resonator is arranged so that the frequency of said second signal also varies in dependence on said physical quantity, and wherein said first resonator and said second resonator are so arranged that the frequencies of said first signal and said second signal vary by the same amount but with an opposite sign for a given variation of said physical quantity.

8. A device according to claim 7, wherein said phase comparator circuit is an EXCLUSIVE OR gate.

9. A device according to claim 7, wherein said second resonator is identical to said first resonator.

10. A device according to claim 9, wherein said phase comparator circuit is an EXCLUSIVE OR gate.

11. A device according to claim 2, wherein said phase comparator circuit is an EXCLUSIVE OR gate.

* * * * *